US011770356B2

(12) United States Patent
Choi

(10) Patent No.: US 11,770,356 B2
(45) Date of Patent: Sep. 26, 2023

(54) METHOD AND DEVICE FOR PROVIDING LOCATION BASED AVATAR MESSENGER SERVICE

(71) Applicant: LINE Plus Corporation, Seongnam-si (KR)

(72) Inventor: Sol E Choi, Seongnam-si (KR)

(73) Assignee: LINE Plus Corporation, Gyeonggi-do (KR)

( * ) Notice: Subject to any disclaimer, the term of this patent is extended or adjusted under 35 U.S.C. 154(b) by 58 days.

(21) Appl. No.: 17/482,634

(22) Filed: Sep. 23, 2021

(65) Prior Publication Data
US 2022/0124063 A1   Apr. 21, 2022

(30) Foreign Application Priority Data

Oct. 15, 2020   (KR) .................. 10-2020-0133608

(51) Int. Cl.
*H04L 51/52* (2022.01)
*G06T 19/00* (2011.01)
*H04L 51/046* (2022.01)
*H04L 51/222* (2022.01)

(52) U.S. Cl.
CPC ............ *H04L 51/52* (2022.05); *G06T 19/006* (2013.01); *H04L 51/046* (2013.01); *H04L 51/222* (2022.05)

(58) Field of Classification Search
CPC ..... H04L 51/52; H04L 51/046; H04L 51/222; H04L 51/10; H04L 51/58; G06T 19/006; G06T 13/40; G06Q 50/30
See application file for complete search history.

(56) References Cited

U.S. PATENT DOCUMENTS

| 11,178,519 | B2 | 11/2021 | Lee et al. | |
| 11,477,606 | B2* | 10/2022 | Renkis | H04L 51/52 |
| 2010/0169798 | A1* | 7/2010 | Hyndman | G06F 3/04817 715/757 |
| 2012/0148106 | A1 | 6/2012 | Sung et al. | |
| 2014/0280600 | A1 | 9/2014 | Jeon | |
| 2015/0245168 | A1* | 8/2015 | Martin | H04W 4/029 715/751 |

(Continued)

FOREIGN PATENT DOCUMENTS

| KR | 10-2008-0085313 A | 9/2008 |
| KR | 10-2011-0057298 A | 6/2011 |

(Continued)

*Primary Examiner* — Austin J Moreau
(74) *Attorney, Agent, or Firm* — Harness, Dickey & Pierce, P.L.C.

(57) ABSTRACT

A method for providing a location based avatar messenger service includes transmitting, by a user terminal, location information of the user terminal to an external system; receiving, by the user terminal, information on users located in a vicinity of the user terminal from the external system; obtaining, by an image sensor of the user terminal, at least one image; and displaying, on a display of the user terminal, the at least one image and a first set of avatars associated with the users located in the vicinity such that the first set of avatars is superimposed on the at least one image, the first set of avatars including one or more avatars, the one or more avatars corresponding, respectively, to one or more users from among the users located in the vicinity.

17 Claims, 12 Drawing Sheets

(56) References Cited

U.S. PATENT DOCUMENTS

| | | | | |
|---|---|---|---|---|
| 2015/0356083 A1* | 12/2015 | Gyongyi | ................. | G06F 16/29 |
| | | | | 707/748 |
| 2017/0345022 A1* | 11/2017 | Tseng | ..................... | G06Q 50/01 |
| 2021/0089117 A1* | 3/2021 | Bodolec | .................. | G09G 5/37 |
| 2021/0295578 A1* | 9/2021 | Lee | ....................... | G06T 13/205 |
| 2021/0319617 A1* | 10/2021 | Ahn | .................. | H04M 1/72439 |
| 2022/0103969 A1* | 3/2022 | Drummond | .......... | G06Q 10/107 |

FOREIGN PATENT DOCUMENTS

| | | | | |
|---|---|---|---|---|
| KR | 10-2011-0072438 A | 6/2011 | | |
| KR | 10-2012-0065480 A | 6/2012 | | |
| KR | 10-2012-0136633 A | 12/2012 | | |
| KR | 10-1285832 B1 | 7/2013 | | |
| KR | 10-2015-0046317 A | 4/2015 | | |
| KR | 10-1654261 B1 | 9/2016 | | |
| KR | 10-2017-0065349 A | 6/2017 | | |
| WO | WO-2012116197 A2 * | 8/2012 | ........... | G06Q 10/101 |
| WO | WO-2014/035368 A1 | 3/2014 | | |
| WO | WO-2018004786 A1 * | 1/2018 | ........... | A63F 13/216 |

\* cited by examiner

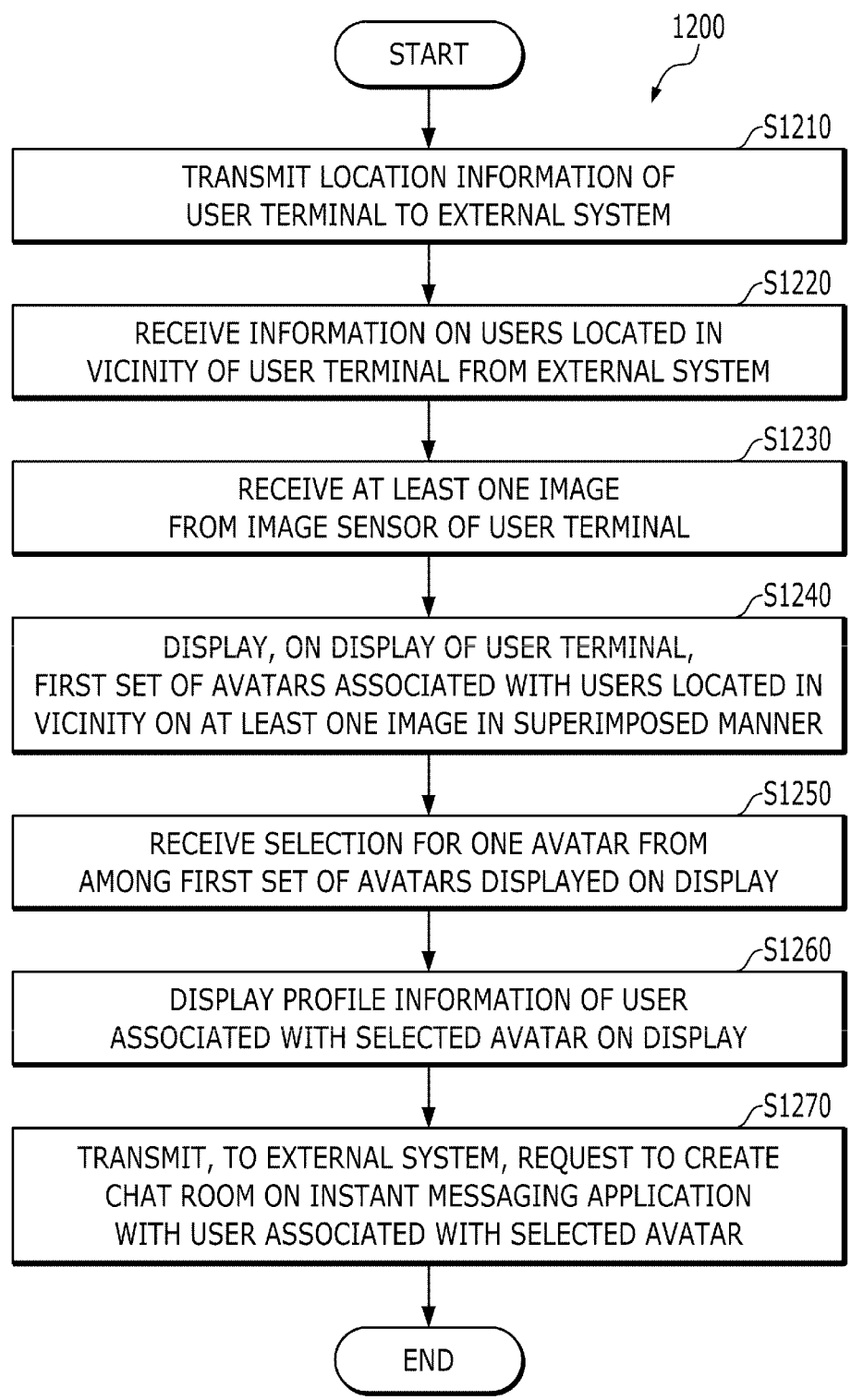

METHOD AND DEVICE FOR PROVIDING LOCATION BASED AVATAR MESSENGER SERVICE

CROSS-REFERENCE TO RELATED APPLICATION

This application claims priority under 35 U.S.C. § 119 to Korean Patent Application No. 10-2020-0133608 filed in the Korean Intellectual Property Office on Oct. 15, 2020, the entire contents of which are hereby incorporated by reference.

BACKGROUND

1. Field

The present disclosure relates to a method and a device for providing a location based avatar messenger service, and more particularly, to a method and a device for providing a location based avatar messenger service, which are capable of sending a message and making a call using an avatar on an instant messaging application.

2. Related Art

There is a widespread distribution of camera-attached terminals, such as smartphones, tablet PCs, laptop computers, desktop computers, and the like. In this environment, growing numbers of users utilize cameras attached to terminals. As a representative example, various augmented reality services using a camera attached to a terminal are provided.

These augmented reality services are mainly provided in the field of mobile games, and recently have been expanded to fields closely related to real life, such as services enabling virtual arrangement of home appliances and furniture in houses. Meanwhile, the online messenger service is an acquaintance-based service, where augmented reality technology has not been actively introduced.

SUMMARY

In order to solve the problems described above, the present disclosure provides a method, a non-transitory computer-readable recording medium storing instructions, and an apparatus for providing an avatar messenger service.

Provided are a method and a device for providing a location based avatar messenger service, which identify location information of a user terminal in the vicinity, display an avatar of a user in the vicinity on a real space image in a superimposed manner, and provide a message transmission and call functions using the displayed avatar.

The present disclosure may be implemented in a variety of ways, including a method, a device, or a computer program stored in a readable storage medium.

According to at least some example embodiments, a method for providing a location based avatar messenger service includes transmitting, by a user terminal, location information of the user terminal to an external system; receiving, by the user terminal, information on users located in a vicinity of the user terminal from the external system; obtaining, by an image sensor of the user terminal, at least one image; and displaying, on a display of the user terminal, the at least one image and a first set of avatars associated with the users located in the vicinity such that the first set of avatars is superimposed on the at least one image, the first set of avatars including one or more avatars, the one or more avatars corresponding, respectively, to one or more users from among the users located in the vicinity.

The method may further include receiving a selection of one avatar from among the first set of avatars displayed on the display; and displaying profile information of a user associated with the selected avatar on the display.

The method may further include receiving a selection of one avatar from among the first set of avatars displayed on the display; and transmitting, to the external system, a request to create a chat room on an instant messaging application with a user associated with the selected avatar.

The chat room may be an open chat room.

The method may further include receiving a selection of one avatar from among the first set of avatars displayed on the display; and transmitting, to the external system, a request to make a voice call on the instant messaging application with a user associated with the selected avatar.

The method may further include during the voice call, displaying the selected avatar on the display, and controlling a motion of the selected avatar displayed on the display based on voice data of a counterpart in the voice call.

Among the users located in the vicinity, the one or more avatars included in the first set of avatars may be associated, respectively, with one or more users located within a first distance in an image capturing direction of the image sensor, from among the users located in the vicinity.

A size of each of the one or more avatars included in the first set of avatars displayed on the display may be determined based on a distance between the user terminal and the one or more users to which the one or more avatars included in the first set of avatars correspond.

A location of each of the one or more avatars included in the first set of avatars displayed on the display may be determined based on a distance between the user terminal and the one or more users to which the one or more avatars included in the first set of avatars correspond.

A face size of each of the one or more avatars included in the first set of avatars displayed on the display may be determined based on evaluation scores associated with the one or more users to which the one or more avatars included in the first set of avatars correspond.

A size of each of the one or more avatars included in the first set of avatars displayed on the display may be determined based on evaluation scores associated with the one or more users to which the one or more avatars included in the first set of avatars correspond.

The first set of avatars displayed on the display may be determined based on evaluation scores associated with the users located in the vicinity.

The method may further include displaying a first graphic object on an avatar associated with a user, from among the users located in the vicinity, who has an evaluation score equal to or greater than a first threshold.

The method may further include, in response to a change in an image capturing direction of the image sensor, displaying, on the display of the user terminal, the at least one image and a second set of avatars, such that the second set of avatars are superimposed on the at least one image, the second set of avatars including one or more avatars corresponding, respectively, to one or more users from among the users located in the vicinity.

The method may further include, in response to a change in a zoom level of the image sensor, displaying, on the display of the user terminal, the at least one image and a third set of avatars, such that the third set of avatars are superimposed on the at least one image, the third set of avatars including one or more avatars corresponding, respectively, to one or more users from among the users located in the vicinity.

The method may further include, in response to receiving a filtering condition, displaying, on the display of the user terminal, the at least one image and a fourth set of avatars, such that the fourth set of avatars are superimposed on the at least one image, the fourth set of avatars including one or more avatars corresponding, respectively, to one or more users from among the users located in the vicinity.

The method may further include receiving an input indicating that an avatar from among the first set of avatars displayed on the display is blocked; and, in response to the input, excluding the blocked avatar from the one or more avatars included in the first set of avatars displayed on the display.

The method may further include in response to receiving a message on an instant messaging application from another user, displaying, on the display, the at least one image such that a second graphic object indicating a location of the another user is superimposed on the at least one image.

According to at least some example embodiments, a non-transitory computer-readable recording medium storing computer-readable instructions that, when executed by one or more processors, cause the one or more processors to perform the method for providing a location based avatar messenger service according to at least some example embodiments.

According to at least some example embodiments, a device for providing a location based avatar messenger service includes a communication module; a memory storing computer-readable instructions; an image sensor; a display; and at least one processor connected to the memory and configured to execute the computer-readable instructions such that the at least one processor is configured to, transmit location information of the device to an external system, receive information on users located in a vicinity of the device from the external system, obtain, using the image sensor, at least one image, and display, on the display, the at least one image and a first set of avatars associated with the users located in the vicinity such that the first set of avatars is superimposed on the at least one image, the first set of avatars including one or more avatars, the one or more avatars corresponding, respectively, to one or more of the users located in the vicinity.

According to at least one example embodiment, the user may find another user by adjusting the image capturing direction, the zoom level, and the like of the image sensor without changing a location in the real world. In addition, it is possible to check the avatars added or removed according to the image capturing direction and the zoom level of the image sensor to identify the approximate locations of the other users corresponding to the avatars in real space.

According to at least one example embodiment, the user can more easily identify the avatar of another user having a high evaluation score on the augmented screen.

According to at least one example embodiment, the user can check the counterpart who has expressed a good feeling for his/her avatar, and attempt to communicate with the corresponding counterpart even when the corresponding counterpart is not currently around the user of the user.

According to at least one example embodiment, the user can easily check the information on users who have a lot in common with the user himself/herself, among the other users who have a good feeling for the user.

According to at least one example embodiment, users who use the location based avatar messenger service can make a video call using avatar images and without revealing his/her face.

The effects of the present disclosure are not limited to the effects described above, and other effects not described can be clearly understood by those of ordinary skill in the art (referred to as "ordinary technician") from the description of the claims.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 12 illustrates a method for providing a location based avatar messenger service according to at least one example embodiment.

DETAILED DESCRIPTION

Figure 1:
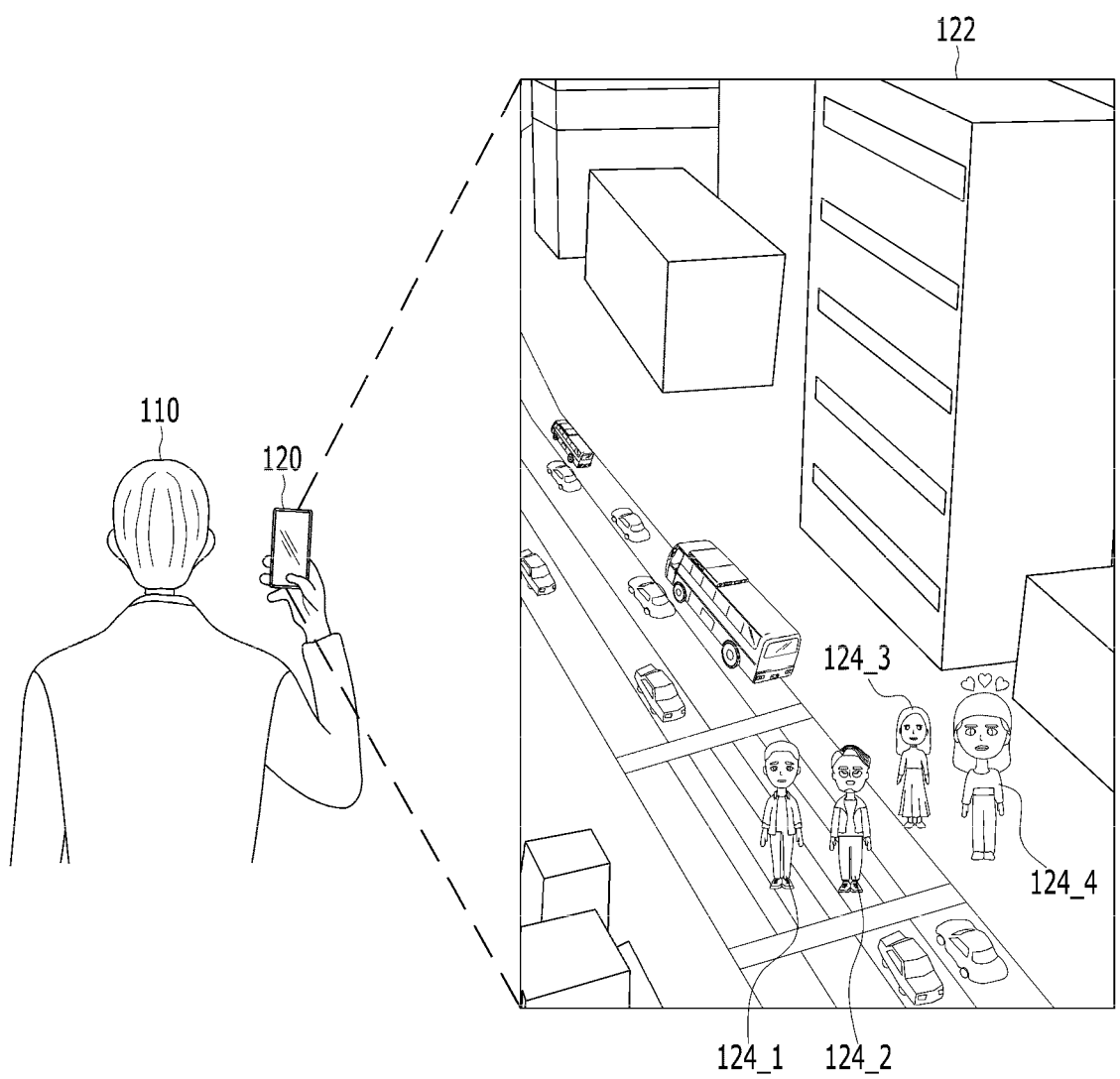
FIG. 1 illustrates an example in which a user uses a user terminal to use a location based avatar messenger service according to at least one example embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of the embodiments, duplicate descriptions of the same or corresponding components may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the present embodiments are merely provided to make the present disclosure complete, and to fully disclose the scope of example embodiments to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in a specific case, a term is arbitrarily selected by the applicant, and the meaning of the term will be described in detail in a corresponding description of the embodiments. Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to at least one example embodiment, the "module" or "unit" may be implemented as a processor and a memory. The term "processor" should be interpreted broadly to encompass, for example, a central processing unit (CPU), a microprocessor, a digital signal processor (DSP), a controller, a microcontroller, a state machine, and so forth. Under some circumstances, the term "processor" may refer to, for example, one or more of an application-specific integrated circuit (ASIC), a programmable logic device (PLD), a field-programmable gate array (FPGA), and so on. According to at least some example embodiments, the term "processor" may refer to a combination of processing devices, e.g., a combination of a DSP and a microprocessor, a plurality of microprocessors, one or more microprocessors in conjunction with a DSP core, or any other combination of such configurations. In addition, the term "memory" should be interpreted broadly to encompass any electronic component capable of storing electronic information. The term "memory" may refer to various types of processor-readable media examples of which include, but are not limited to, random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with a processor is in electronic communication with the processor.

In the present disclosure, a "chat room" may refer to a virtual space or group which may be generated in an instant messaging application installed on a computing device, and which may be participated by one or more users (or user accounts). For example, one or more user accounts may participate or be included in the chat room and exchange various types of messages, files, and the like. In addition, in the chat room, Voice over Internet Protocol (VoIP) voice call function, VoIP video call function, and live broadcast function (VoIP real time video transmission function) are provided, enabling voice calls, video calls, video streaming, or the like to be performed between user accounts.

In the present disclosure, an "open chat room" may refer to a chat room where the user (or user account) before entering the chat room may be have to input any of new profile information (for example, profile information to be used in the open chat room, profile information to be used in the location based avatar messenger service, and the like) by the user (or user account) to enter, and where anonymity is guaranteed. In an embodiment, the open chat room does not require the participating users to be friends with each other in the instant messaging application. In addition, basic profile information (profile picture, name, birthday, status message, and the like) on the instant messaging application set by the user is not disclosed to other users in the open chat room. The open chat room may be distinguished from a general chat room where the basic profile information on the instant messaging application set by the user is disclosed to the counterpart. In addition, two or more users can participate in the open chat room.

In the present disclosure, the term "user account" may represent an account created and used by a user in an instant messaging application or data related thereto. In addition, the user account of the instant messaging application may refer to a user who uses the instant messaging application. Likewise, the user may refer to the user account in the instant messaging application.

FIG. 1 illustrates an example in which a user uses a user terminal to use a location based avatar messenger service according to at least one example embodiment. As illustrated, a user 110 may use an image sensor of a user terminal 120 (e.g., a camera of a smartphone, a camera of a tablet, and the like) to photograph the real space. In this case, through an augmented screen 122 displayed on a display of the user terminal 120, the user 110 may identify other users located in the vicinity.

In an embodiment, the augmented screen 122 may include an image of the real space captured by using the image sensor of the user terminal 120, and avatars 124_1, 124_2, 124_3, and 124_4 of the other users displayed on the image of the real space in a superimposed manner. In this example, the avatars of the other users displayed on the augmented screen 122 may be avatars of the other users located within a predetermined distance (e.g., 200 m) in an image capturing direction of the image sensor of the user terminal 120. In this example, the user 110 may check the number of avatars displayed on the screen, and the like, and freely change the predetermined distance.

In an embodiment, locations at which the avatars 124_1, 124_2, 124_3, and 124_4 are displayed on the augmented screen 122 may be determined based on distances between the other users and the user terminal 120. For example, when another user associated with the second avatar 124_2 is located closer to the user terminal 120 than yet another user associated with the third avatar 124_3, the second avatar 124_2 may be displayed on a lower side on the augmented screen 122 than the third avatar 124_3. Likewise, when another user associated with the first avatar 124_1 is located on the left side than yet another user associated with the fourth avatar 124_4 in the image capturing direction of the image sensor of the user terminal 120, the first avatar 124_1 may be displayed on the left side on the augmented screen 122 than the fourth avatar 124_4.

In an embodiment, when the user 110 changes the facing direction or the magnification of the image sensor of the user terminal 120, the avatar displayed on the augmented screen 122 may be changed. For example, when the user 110 turns the user terminal 120 to the left to change the facing direction of the image sensor, the avatars of the other users located within a predetermined distance in the changed direction of the image sensor may be displayed in a superimposed manner on the image of the real space captured by the image sensor. In another example, when the user 110 changes a level of zoom (e.g., optical zoom, digital zoom, and the like) of the image sensor of the user terminal 120, the avatars of the users located closer or further away may be displayed in a superimposed manner on the image of the real space according to the changed level of zoom.

In an embodiment, the user 110 may set such that only the avatar of the user that satisfies a predetermined condition is displayed on the augmented screen 122. For example, the user 110 may input filtering conditions (age, gender, hobbies, occupational groups, evaluation scores, and the like) into the user terminal 120 to display on the augmented screen 122 only the avatars of the users in the vicinity that satisfy the filtering conditions. Additionally or alternatively, the avatars of the other users who have less than the predetermined evaluation score and/or other users blocked by the user 110 may not be displayed on the augmented screen 122.

In an embodiment, the user 110 may set such that, among the other users located in the vicinity, only the avatars of the other users recommended by a server (e.g., an information processing system of FIG. 2) may be displayed on the augmented screen 122. The list of the other users recommended by the server may be determined based on profile information (e.g., gender, region, age, hobbies, occupation, interests, and the like) of the other users, behavioral histories of the other users (a history of giving "likes" in the past, a history of giving star ratings, a chatting history, and the like). For example, among the other users located in the vicinity, only the avatars of the other users having a high similarity to the profile information of the user may be displayed on the augmented screen 122. Additionally or alternatively, among the other users located in the vicinity, only the avatars of the other users having a similar behavior pattern to the user may be displayed on the augmented screen 122. In this case, the avatars of the top n people (10, 20, 50 people, and the like) having the highest matching scores with the user may be displayed on the augmented screen 122.

In an embodiment, the user 110 may select one of the avatars 124_1, 124_2, 124_3, and 124_4 displayed on the augmented screen 122 with a touch input or the like to check the profile information of a user associated with the selected avatar. In this example, the profile information of the other user may include information such as a name (e.g., an anonymous nickname), a gender, an occupation, hobbies, interests, and the like input by the corresponding user. In addition, the user 110 may create a chat room on the instant messaging application with the user associated with the selected avatar to perform chatting, voice call, video call, and the like with the counterpart. In this example, the chat room on the instant messaging application may be an open chat room that minimizes or, alternatively, reduces the exposure of personal information. Additionally or alternatively, the user 110 may perform an online game or other online activity with the counterpart within the created chat room.

With such a configuration, the user may start a conversation with a more familiarly visualized object using an avatar reflecting his/her personality. In this case, since the information disclosed to the counterpart is virtual profile information set for the avatar rather than actual personal information of the user, the user can be guaranteed anonymity. In addition, if desired, the user may convert a conversation using virtual profile information (e.g., chatting in an open chat room) into a conversation using an actual personal account (e.g., chatting in a normal chat room) in that a messenger service with a wide range of choices for personal information disclosure may be provided to the user.

Figure 2:
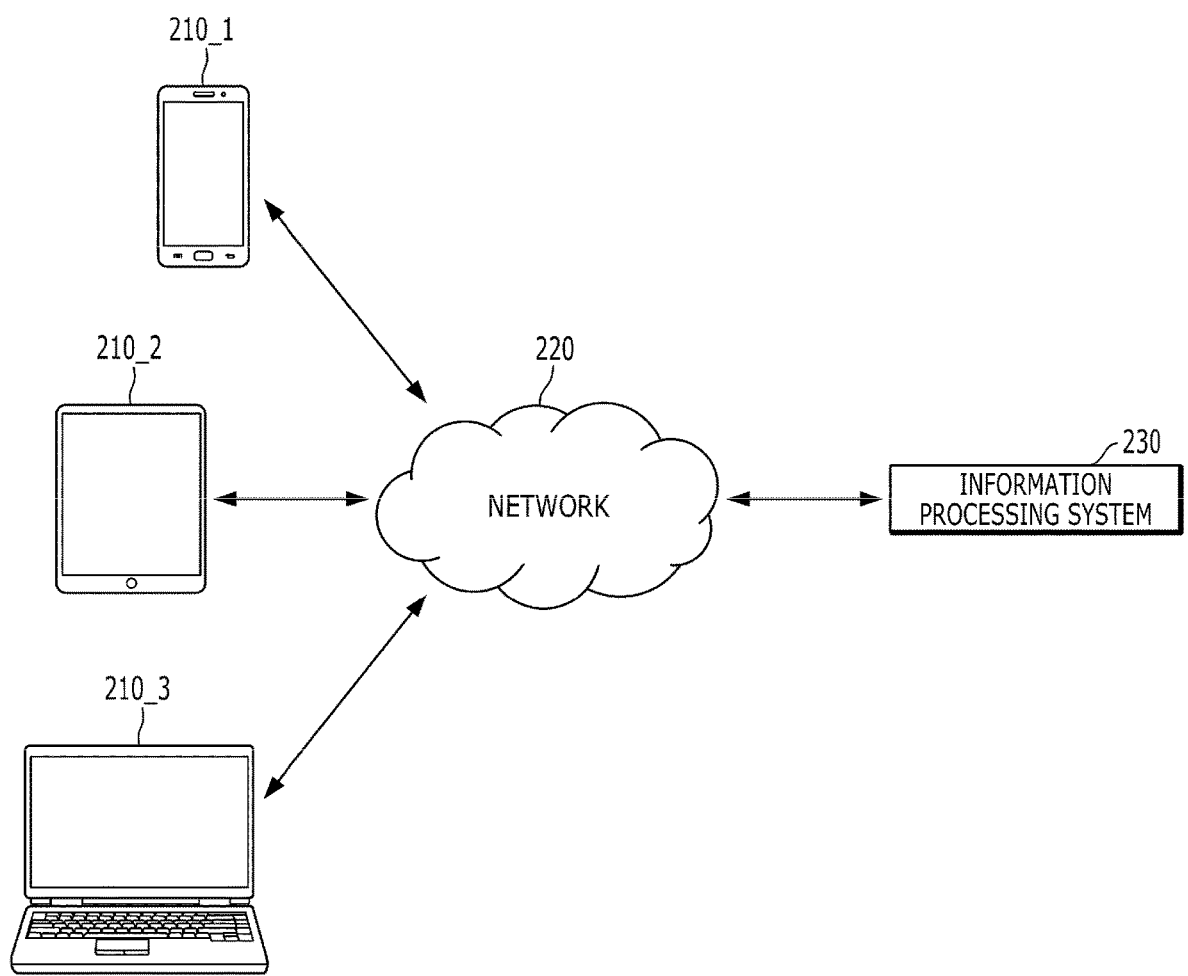
FIG. 2 is a schematic diagram illustrating a configuration in which an information processing system is communicatively connected with a plurality of user terminals in order to provide a location based avatar messenger service and an instant messaging service according to at least one example embodiment.

FIG. 2 is a schematic diagram illustrating a configuration in which an information processing system is communicatively connected with a plurality of user terminals in order to provide a location based avatar messenger service and an instant messaging service according to at least one example embodiment. An information processing system 230 may include a system(s) capable of providing the location based avatar messenger services and/or the instant messaging services via a network 220. In an embodiment, the information processing system 230 may include one or more server devices and/or databases, or one or more distributed computing devices and/or distributed databases based on cloud computing services, which are capable of storing, providing and executing computer-executable programs (e.g., downloadable applications) and data relating to the location based avatar messenger service and/or the instant messaging service. For example, the information processing system 230 may include separate systems (e.g., servers) for providing the location based avatar messenger service or the instant messaging service.

The location based avatar messenger service or the instant messaging service provided by the information processing system 230 may be provided to the user through an application for location based avatar messenger or instant messenger installed in each of a plurality of user terminals 210_1, 210_2, and 210_3, or a web browser application. In an embodiment, the location based avatar messenger service may be provided as part of the instant messaging service. The location based avatar messenger service or the instant messaging service provided by the information processing system 230 may be provided to the user through an application for location based avatar messenger/instant messenger installed in each of the plurality of user terminals 210_1, 210_2, and 210_3, or a web browser application.

The plurality of user terminals 210_1, 210_2, and 210_3 may communicate with the information processing system 230 through the network 220. The network 220 may be configured to enable communication between the plurality of user terminals 210_1, 210_2, and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication is not limited, and may include a communication method using a communication network (e.g., mobile communication network, wired Internet, wireless Internet, broadcasting network, satellite network, and so on) that may be included in the network 220 as well as short-range wireless communication between the user terminals 210_1, 210_2 and 210_3.

In FIG. 2, a mobile phone terminal 210_1, a tablet terminal 210_2, and a PC terminal 210_3 are illustrated as the examples of the user terminals, but embodiments are not limited thereto, and the user terminals 210_1, 210_2, and 210_3 may be any computing device that is capable of wired and/or wireless communication and is equipped with an image sensor. For example, the user terminal may include a smart phone, a mobile phone, a navigation system, a computer, a notebook computer, a digital broadcasting terminal, Personal Digital Assistants (PDA), a Portable Multimedia Player (PMP), a tablet PC, a game console, a wearable device, an internet of things (IoT) device, a virtual reality (VR) device, an augmented reality (AR) device, and the like. In addition, FIG. 2 illustrates that three user terminals 210_1, 210_2, and 210_3 are in communication with the information processing system 230 through the network 220, but embodiments are not limited thereto, and a different number of user terminals may be configured to be in communication with the information processing system 230 through the network 220. The plurality of user terminals 210_1, 210_2, and 210_3 may be user terminals of users using the location based avatar messenger service/instant messaging service.

In an embodiment, the information processing system 230 may receive media data (e.g., photos, images, texts, and the like) input from the user terminal through an application for location based avatar messenger or instant messenger operating on the user terminal. After that, the information processing system 230 may store the received media data and/or transmit the same to another user terminal connected to the network 220. Additionally, the information processing system 230 may control the location based avatar messenger service or the instant messaging service based on a user input received from the user terminal.

Figure 3:
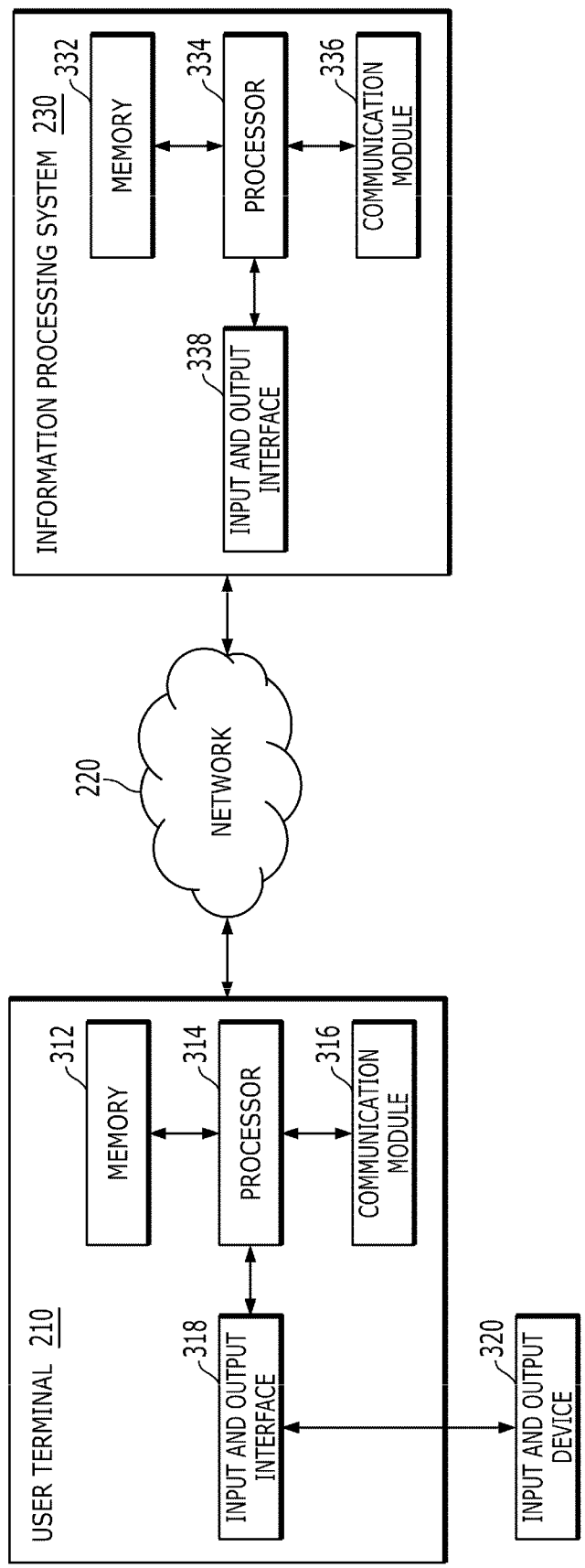
FIG. 3 is a block diagram illustrating an internal configuration of the user terminal and the information processing system according to at least one example embodiment.

FIG. 3 is a block diagram illustrating an internal configuration of the user terminal and the information processing system according to at least one example embodiment. The user terminal 210 may refer to any computing device that is capable of executing the application for location based avatar messenger or instant messenger, the web browser application, and the like, and capable of wired and wireless communication, and may include the mobile phone terminal 210_1, the tablet terminal 210_2, and the PC terminal 210_3 of FIG. 2, and the like. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using the respective communication modules 316 and 336. According to at least some example embodiments, one or both of the communication modules 316 and 336 may be implemented by circuitry or a combination of circuitry and software (e.g., firmware). Thus, the communication modules 316 and 336 may also be referred to in the present specification as the communication circuits 316 and 336. In addition, an input and output device 320 may be configured to input information and/or data to the user terminal 210 or to output information and/or data generated from the user terminal 210 through the input and output interface 318.

The memories 312 and 332 may include any non-transitory computer-readable recording medium. According to at least one example embodiment, the memories 312 and 332 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is distinct from the memory. In addition, an operating system and at least one program code (e.g., a code for location based avatar messenger or instant messenger application, and the like installed and driven in the user terminal 210) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312 and 332 through the communication modules rather than the computer-readable recording medium. For example, at least one program may be loaded into the memories 312 and 332 based on a computer program (for example, the application for location based avatar messenger or instant messenger) installed by files provided by developers or a file distribution system for distributing an installation file of the application through the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to program code stored in a recording device such as the memories 312 and 332.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., a request to create an open chat room, voice data, and the like) generated by the processor 314 of the user terminal 210 according to the program code stored in the recording device such as the memory 312 or the like may be transmitted to the information processing system 230 through the network 220 under the control of the communication module 316. Conversely, a control signal or a command provided under the control of the processor 334 of the information processing system 230 may be received by the user terminal 210 through the communication module 316 of the user terminal 210 via the communication module 336 and the network 220. For example, the user terminal 210 may receive information on users in the vicinity (location information, profile information, avatar information, and the like of the users in the vicinity) from the information processing system 230.

The input and output interface 318 may be a means for interfacing with the input and output device 320. The input and output device 320 may include one or more input devices and/or one or more output devices. Examples of input devices that may be included in the input and output device 320 include, but are not limited to, a camera, a keyboard, a microphone, a mouse, an audio sensor and/or an image sensor, etc. Examples of input devices that may be included in the input and output device 320 include, but are not limited to, a display (e.g., a touchscreen display that performs both input and output functions), a speaker, a haptic feedback device, etc. According to at least some example embodiments, the input and output interface 318 may include hardware (e.g., one or more circuits) and/or software (e.g., firmware) for providing an interface between the processor 314 and the input and/or output devices included in the input and output device 320.

While FIG. 3 illustrates that the input and output device 320 is not included in the user terminal 210, embodiments are not limited thereto, and the input and output device 320 may be configured as one device with the user terminal 210. In addition, the input and output interface 338 of the information processing system 230 may be a means for interfacing with a device (not illustrated) for inputting or outputting, which may be connected to the information processing system 230 or included in the information processing system 230. In FIG. 3, while the input and output interfaces 318 and 338 are illustrated as the components configured separately from the processors 314 and 334, embodiments are not limited thereto, and the input and output interfaces 318 and 338 may be configured to be included in the processors 314 and 334.

The user terminal 210 and the information processing system 230 may include more components than the components illustrated in FIG. 3. Meanwhile, most of the related components may not necessarily require exact illustration. According to at least one example embodiment, the user terminal 210 may be implemented to include at least a part of the input and output device 320 described above. In addition, the user terminal 210 may further include other components such as a transceiver, a Global Positioning System (GPS) module, a camera, various sensors, a database, and the like. For example, when the user terminal 210 is a smartphone, it may generally include components included in the smartphone, and for example, it may be implemented such that various components such as an acceleration sensor, a gyro sensor, a camera module, various physical buttons, buttons using a touch panel, input and output ports, a vibrator for vibration, and so on are further included in the user terminal 210.

According to at least one example embodiment, the processor 314 of the user terminal 210 may be configured to operate the application for location based avatar messenger or instant messenger, or the web browser application. In this case, the program code associated with the corresponding application may be loaded into the memory 312 of the user terminal 210. While the application is running, the processor 314 of the user terminal 210 may receive information and/or data provided from the input and output device 320 through the input and output interface 318 or receive the information and/or data from the information processing system 230 through the communication module 316, and process the received information and/or data and store it in the memory 312. In addition, such information and/or data may be provided to the information processing system 230 through the communication module 316.

While the application for location based avatar messenger or instant messenger, or the web browser application is running, the processor 314 may receive text, image, video, and the like input or selected through the input device such as a camera, a microphone, and the like that includes a touch screen, a keyboard, an audio sensor and/or an image sensor connected to the input and output interface 318, and store the received text, image, and/or video or the like in the memory 312, or provide it to the information processing system 230 through the communication module 316 and the network 220.

The processor 334 of the information processing system 230 may be configured to manage, process, and/or store the information and/or data received from a plurality of user terminals and/or a plurality of external systems. In an embodiment, the processor 334 may store, process, and transmit location information, profile information, avatar information, and the like received from the user terminal 210. Additionally or alternatively, the processor 334 may control the location based avatar messenger service or the instant messaging service in response to a user input received from the user terminal 210.

Figure 4:
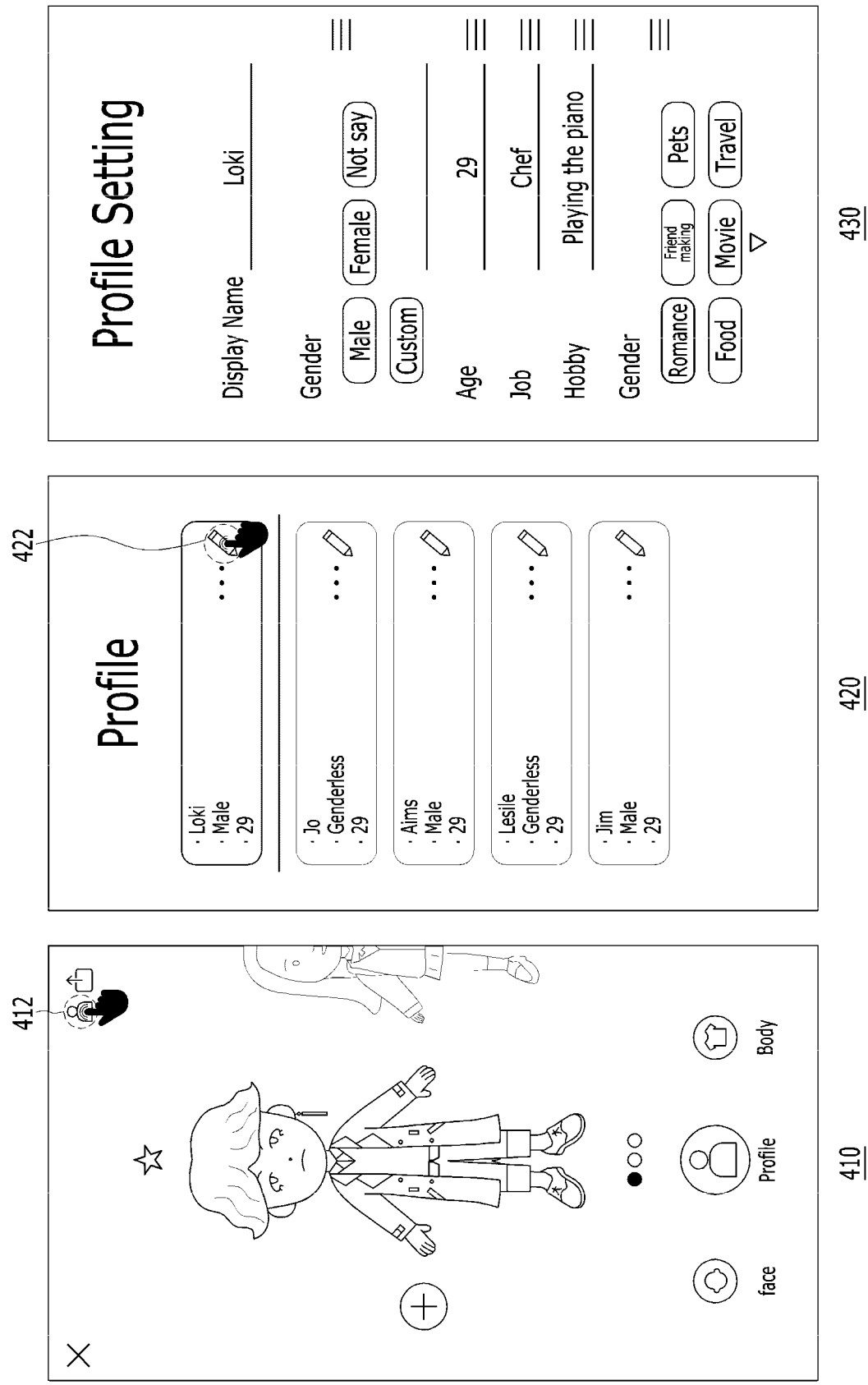
FIG. 4 illustrates one or more example screens, which may be displayed by a user terminal, for explaining an example operation in which a user sets an avatar and a profile to be used in a location based avatar messenger service according to at least one example embodiment.

FIG. 4 illustrates one or more example screens, which may be displayed by a user terminal, for explaining an example operation in which the user sets an avatar and a profile to be used in the location based avatar messenger service according to at least one example embodiment. FIG. 4 illustrates a first operation step 410, a second operation step 420, and a third operation step 430 of the user terminal. The first operation step 410 represents an example in which the user selects an avatar to be used in the location based avatar messenger service. As illustrated, the user may select one of the previously created avatars. For example, the user may select a first icon 412 displayed on the display with a touch input or the like to select one of the avatars that the user has previously created. At this time, the avatar selected by the user may be displayed as the avatar of the corresponding user on the terminals of the other users in the vicinity who are using the same service.

In an embodiment, the user may create a new avatar to be used in the location based avatar messenger service. In this case, the user may determine the face, body, and item (clothes, accessories, and the like) of the avatar to be newly created, respectively. In addition, the user may make his/her avatar stand out from the other users' avatars by decorating his/her avatar using a paid item. For example, the user may use a speech balloon item to add a speech balloon in which a specific text is input near his/her avatar, or add various visual objects or effects (e.g., avatar lighting effect).

The second operation step 420 represents an example in which the user selects one of profiles that are previously created. As illustrated, the user may select one (Loki) from among the previously created profiles (Loki, Jo, Aims, Leslie, and Jim) and select a second icon 422 to edit the profile. The profile may include information such as name, gender, age, and the like. In another embodiment, the user may create a new profile.

The third operation step 430 represents an example in which the user edits a profile. As illustrated, the user may input and modify the name (e.g., anonymous nickname), gender, age, occupation, hobbies, interests, and the like with a touch input or the like. Since the user can arbitrarily input the profile information, the user can use the location based avatar messenger service while maintaining anonymity. In this example, the profile used by the user in the location based avatar messenger service may be different from the profile used by the same user in the instant messaging application.

In an embodiment, the user may perform authentication with respect to some of the profile information (e.g., gender, age, and the like). In this case, among the profile information of the user, the authenticated information, that is, the information that matches the actual information of the user may be displayed in different ways to be distinguished from the rest of the information. For example, an authentication icon may be displayed near the authenticated information among the profile information of the user, or the authenticated information may be displayed in different colors, fonts, and sizes. In an embodiment, the user may authenticate some of the profile information through a service other than the avatar messenger service (e.g., an instant messaging service, a mobile phone text authentication service, and the like). Alternatively or additionally, the user may link some or all of the personal information authenticated by the service other than the avatar messenger service to be automatically entered into the profile of the avatar messenger service. With this configuration, another user can easily check the information among the user profile information, which matches the actual information of the user.

Additionally or alternatively, the user may set such that some or all of the profile information is public or private to other users. For example, the user may set such that only the name, gender, and interests of the user's profile information are disclosed. In another example, the user may set such that the user's profile information is disclosed only to other users who have the same interests as himself/herself or are of the opposite sex.

Figure 5:
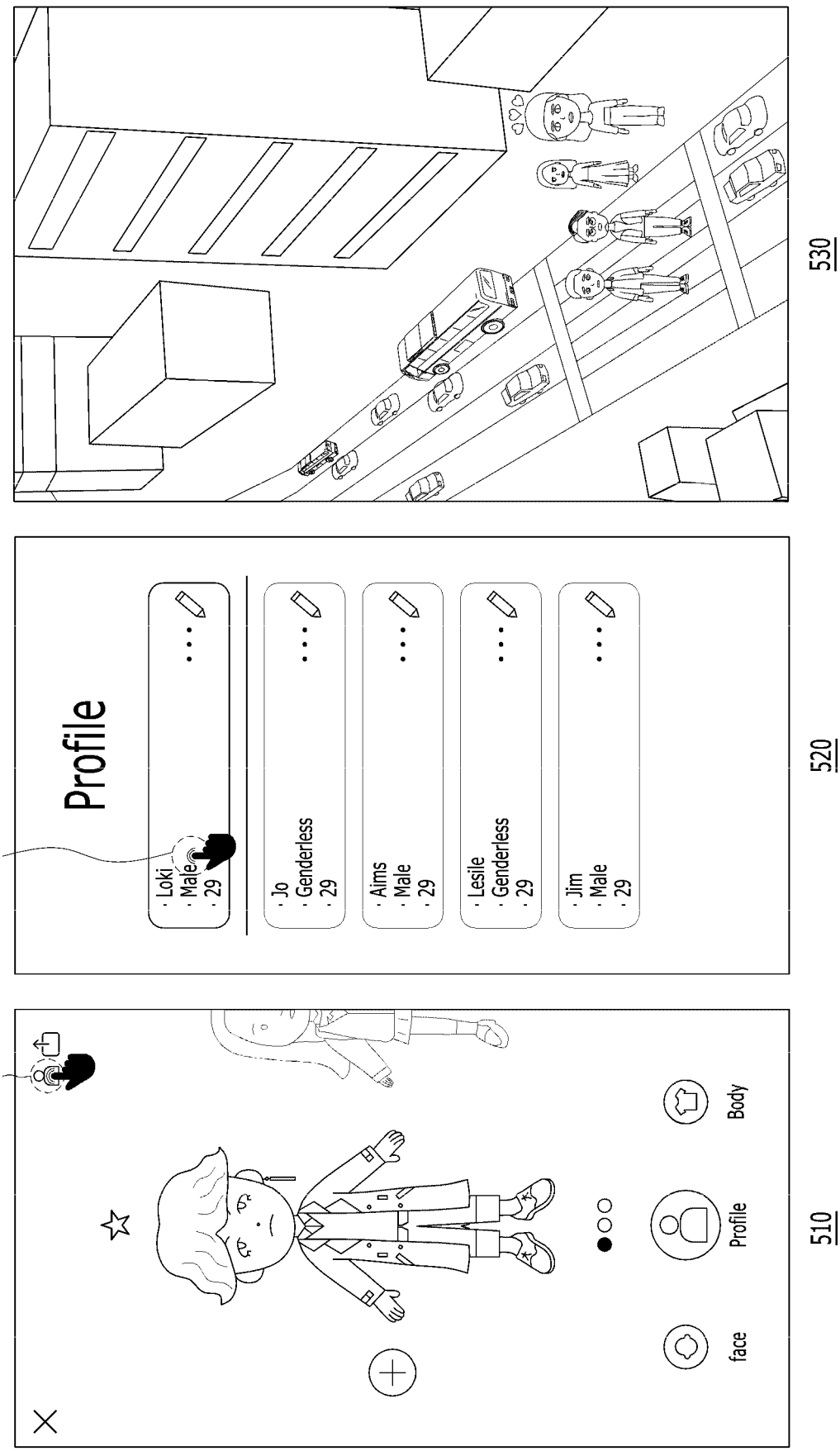
FIG. 5 illustrates one or more example screens, which may be displayed by a user terminal, for explaining an example operation in which a user selects an avatar and a profile to start a location based avatar messenger service according to at least one example embodiment.

FIG. 5 illustrates one or more example screens, which may be displayed by a user terminal, for explaining an example operation in which the user selects an avatar and a profile to start the location based avatar messenger service according to at least one example embodiment. FIG. 5 illustrates a first operation step 510, a second operation step 520, and a third operation step 530 of the user terminal. The first operation step 510 represents an example in which the user selects an avatar to be used in the location based avatar messenger service. As illustrated, the user may select an icon 512 displayed on the display with a touch input or the like to select one of the avatars that the user has previously created.

The second operation step 520 represents an example in which the user selects one of profiles that are previously created. As illustrated, the user may select an area 522 with a touch input or the like to select one (Loki) of five previously created profiles (Loki, Jo, Aims, Lesile, and Jim). In an embodiment, the profile most recently used by the user may be displayed at the top of the list of profiles.

The third operation step 530 represents an example in which the location based avatar messenger service is started in response to the user selecting the area 522. When the avatar messenger service is started, the image sensor of the user terminal may be activated, and an image captured by the image sensor may be displayed on the display. In addition, the avatars of the other users located in the vicinity of the user may be displayed in a superimposed manner on the image of the real space captured by the image sensor.

Specifically, when the avatar messenger service is started, the user terminal may transmit his/her location information to an external system (e.g., the information processing system of FIG. 2). In addition, both the avatar and profile information set by the user may be transmitted to the external system. In this case, the external system may use the location information of the user terminal and the location information of the other user terminals to transmit information (e.g., location information, profile information, avatar images, and the like of the other users) on other users located in the vicinity of the user to the user terminal. Accordingly, the user terminal may display on the display the avatars of the other users located in the vicinity of the user.

Figure 6:
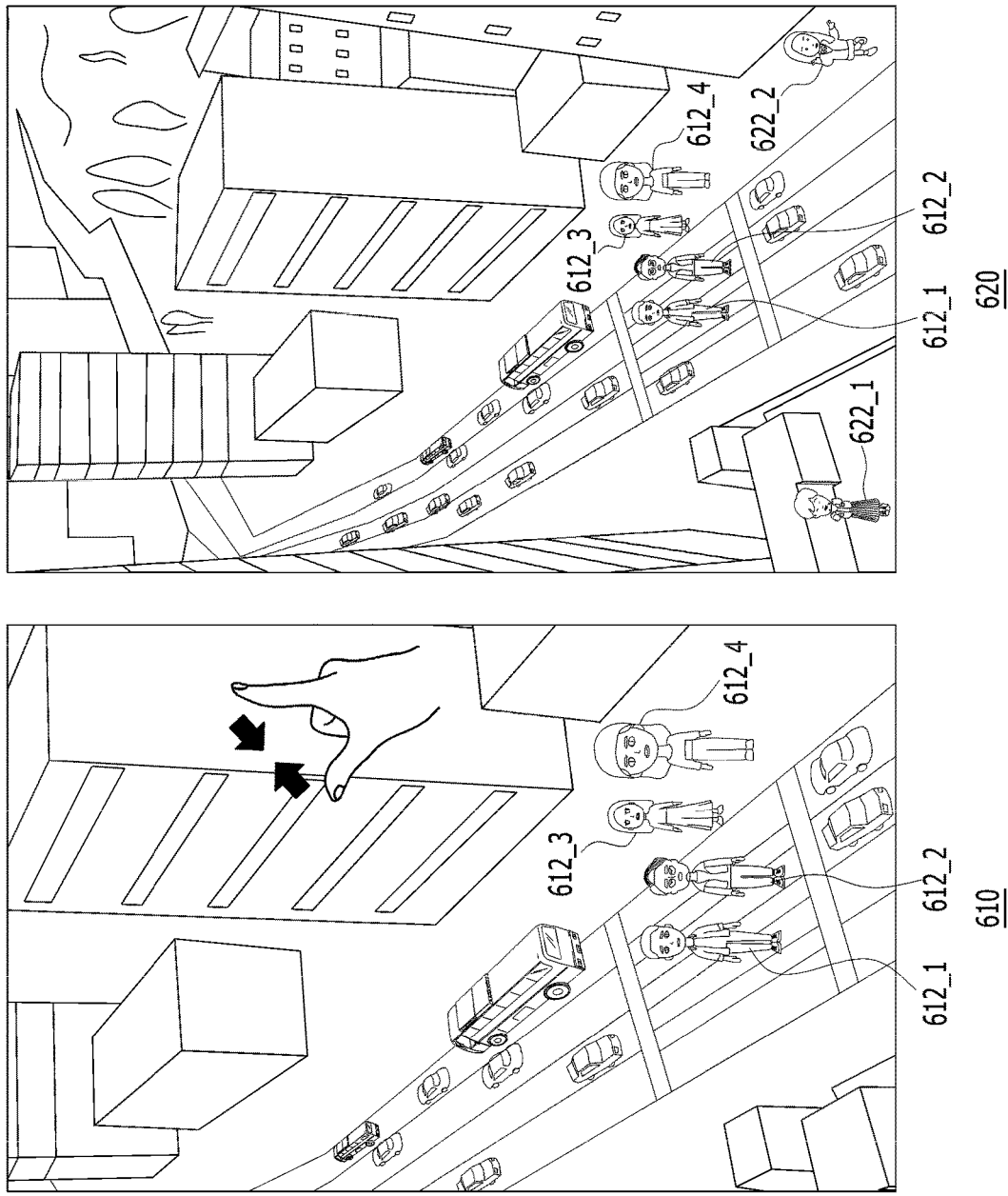
FIG. 6 illustrates one or more example screens, which may be displayed by a user terminal, for explaining an example operation in which a user changes a zoom level of an image sensor to change an avatar displayed on a display according to at least one example embodiment.

FIG. 6 illustrates one or more example screens, which may be displayed by a user terminal, for explaining an example operation in which the user changes a zoom level of the image sensor to change the avatar displayed on the display according to at least one example embodiment. FIG. 6 illustrates a first operation step 610 and a second operation step 620 of the user terminal. The first operation step 610 represents an example in which the user terminal displays a first augmented screen on which a first set of avatars 612_1, 612_2, 612_3, and 612_4 are superimposed. As illustrated, the user terminal may receive from the user a user input (multi-touch input, pinch gesture, and the like) to increase the field of view (FOV) of the image sensor (that is, zoom out).

In an embodiment, the size of each of the first set of avatars 612_1, 612_2, 612_3, and 612_4 displayed on the first augmented screen may be determined based on a distance between another user associated with the avatar and the user terminal. For example, the size of the avatar associated with another user located 150 m away from the user terminal may be displayed to be larger than the size of the avatar associated with another user located 200 m away from the user terminal. According to this configuration, the user can roughly estimate the relative locations of the other users based on the sizes of the avatars.

The second operation step 620 represents an example in which the user terminal displays a second augmented screen on which a second set of avatars 612_1, 612_2, 612_3, 612_4, 622_1, and 622_2 are superimposed, in response to receiving a user input to increase the field of view (FOV) of the image sensor. As illustrated, the real space image of the second augmented screen includes an image of the real space obtained by capturing an image of the real space in the same direction as the first augmented screen with a wider angle of view. In addition, as the FOV of the image sensor increases, the second augmented screen may include new avatars 622_1 and 622_2. In this example, the new avatars 622_1 and 622_2 may be those of the users who are not included in the FOV of the first augmented screen, but included in the FOV of the second augmented screen.

Additionally or alternatively, as the FOV of the image sensor increases, the avatars of the users outside a certain distance among the first set of avatars 612_1, 612_2, 612_3, and 612_4 may not be displayed. For example, the first augmented screen may display the avatars of the other users located within 200 m, while the second augmented screen may display the avatars of the other users located within 150 m. That is, the depth of the avatar displayed on the display may decrease in inverse proportion to the increase in the FOV of the image sensor.

FIG. 6 illustrates an example in which the user increases the FOV of the image sensor (zoom out), but it is also possible for the user to decrease the FOV of the image sensor (zoom in). In this case, the third augmented screen obtained by capturing an image of the real space in the same direction as the first augmented screen with a narrower angle of view may be displayed on the display. As the FOV decreases, the third augmented screen may include a third set of avatars from which some of the first set of avatars 612_1, 612_2, 612_3 and 612_4 have been removed. The avatars removed from the third augmented screen may be the avatars of the users who are included in the FOV of the first augmented screen but not included in the FOV of the third augmented screen.

Additionally or alternatively, as the FOV of the image sensor decreases, an avatar located at a greater distance that is not included in the first augmented screen may be included in the third augmented screen. For example, the first augmented screen may display the avatars of the other users located within 200 m, while the third augmented screen may display the avatars of the other users located within 250 m. That is, the depth of the avatar displayed on the display may increase in inverse proportion to the decrease in the FOV of the image sensor.

In the present disclosure, the user input for changing the zoom level of the image sensor may include a touch input on the display, but is not limited thereto. For example, the user may change the zoom level of the image sensor by using a physical button of the user terminal. As another example, the user terminal may change the zoom level of the image sensor according to a gesture of the user detected by the image sensor.

Additionally or alternatively, the user may change the image capturing direction of the image sensor, and the user terminal may accordingly display on the display a fourth augmented screen obtained by capturing the real space in a different direction from the first augmented screen. In this case, the fourth augmented screen may include a second set of avatars different from the first set of avatars. The second set of avatars may be the avatars of the other users located within a predetermined distance in the changed direction of the image sensor.

With this configuration, the user may find another user by adjusting the image capturing direction, the zoom level, and the like of the image sensor without changing a location in the real world. In addition, the user may check the avatars added or removed according to the image capturing direction and the zoom level of the image sensor to identify the approximate locations of the other users corresponding to the avatars in real space.

Figure 7:
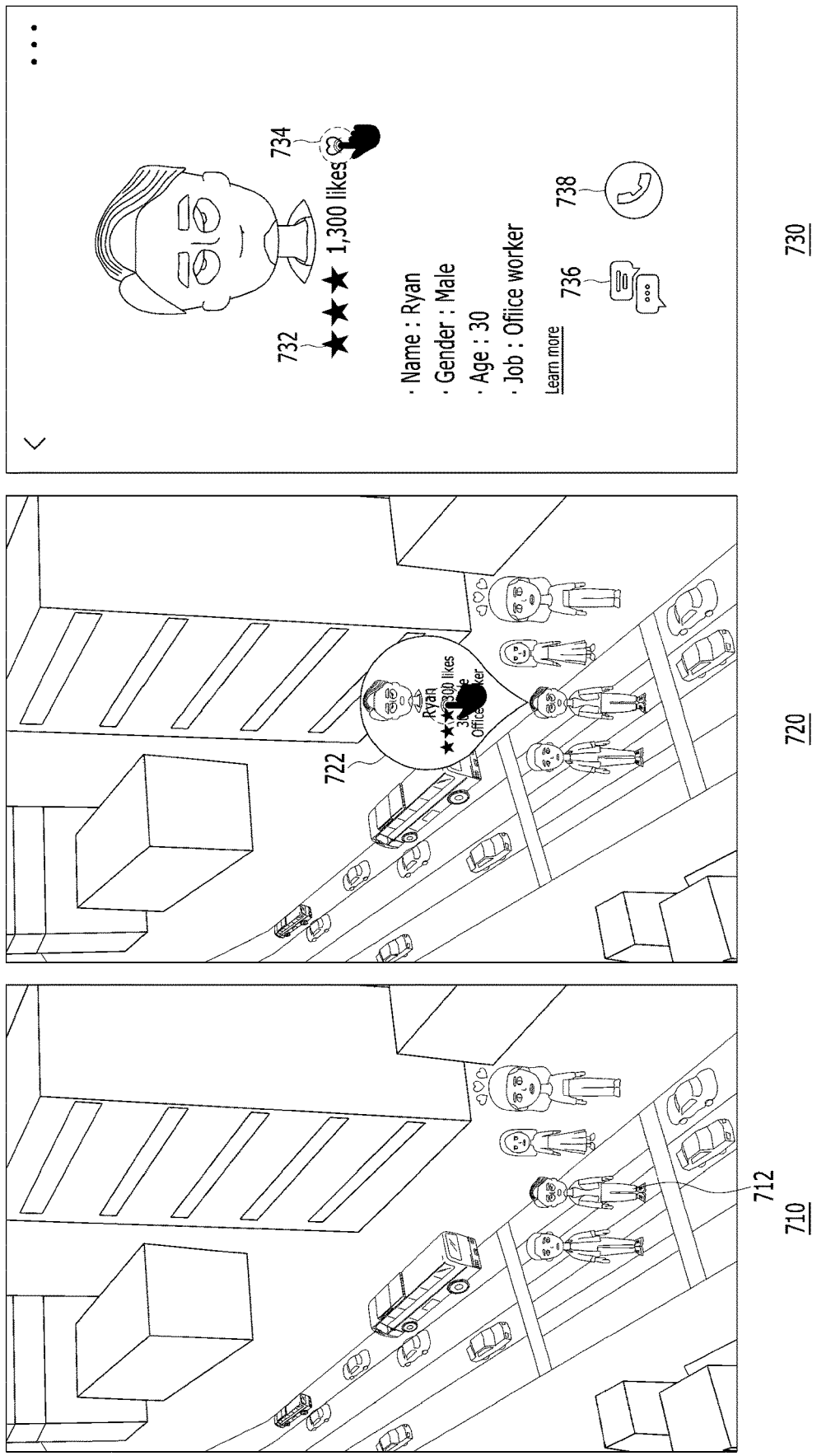
FIG. 7 illustrates one or more example screens, which may be displayed by a user terminal, for explaining an example operation in which a user selects one avatar to check profile information of an interesting user according to at least one example embodiment.

FIG. 7 illustrates one or more example screens, which may be displayed by a user terminal, for explaining an example operation in which the user selects one avatar to check the profile information of an interesting user according to at least one example embodiment. FIG. 7 illustrates a first operation step 710, a second operation step 720, and a third operation step 730 of the user terminal. The first operation step 610 represents an example in which the user selects one avatar 712 from among a plurality of avatars displayed on the display with a touch input or the like.

The second operation step 720 represents an example of displaying the profile information of the user associated with a corresponding avatar in response to the user selecting the avatar 712. In an embodiment, profile information 722 of a user associated with the avatar 712 may be displayed on the display in the form of a balloon icon. For example, the profile information 722 may include a face image, name (e.g., nickname), evaluation scores (e.g., star rating, number of likes, and the like), age, gender, occupation, and the like. The user may select the profile information 722 displayed on the display with a touch input or the like to move to a detailed profile page of the user associated with the selected avatar 712.

The third operation step 730 represents an example in which, in response to the user selecting the profile information 722, the user terminal displays the detailed profile page of the user associated with the selected avatar 712 on the display. The profile page screen may include profile information, icons 732 and 734 for assigning evaluation scores, and icons 736 and 738 for communicating with the user associated with the avatar. In an embodiment, the user may select the first icon 732 with a touch input or the like to give a star rating (e.g., good manner point) to the user associated with the avatar 712 or may check the star ratings for each of items (e.g., quick response, good chat manner, good phone manner, and the like) of the user associated with the avatar 712. Additionally or alternatively, the user may select the second icon 734 with a touch input or the like to give a "likes" to the user associated with the avatar 712.

In an embodiment, the user may select the third icon 736 to send a message to the user associated with the avatar 712. In this case, in order to guarantee the anonymity of users who use the location based avatar messenger service, an open chat room on the instant messaging application with the user associated with the avatar 712 may be created. In another embodiment, the user may select the fourth icon 738 to initiate a voice or video call with the user associated with the avatar 712. In this case, in order to guarantee the anonymity of users using the location based avatar messenger service, the users may make a video call using the avatar.

Figure 8:
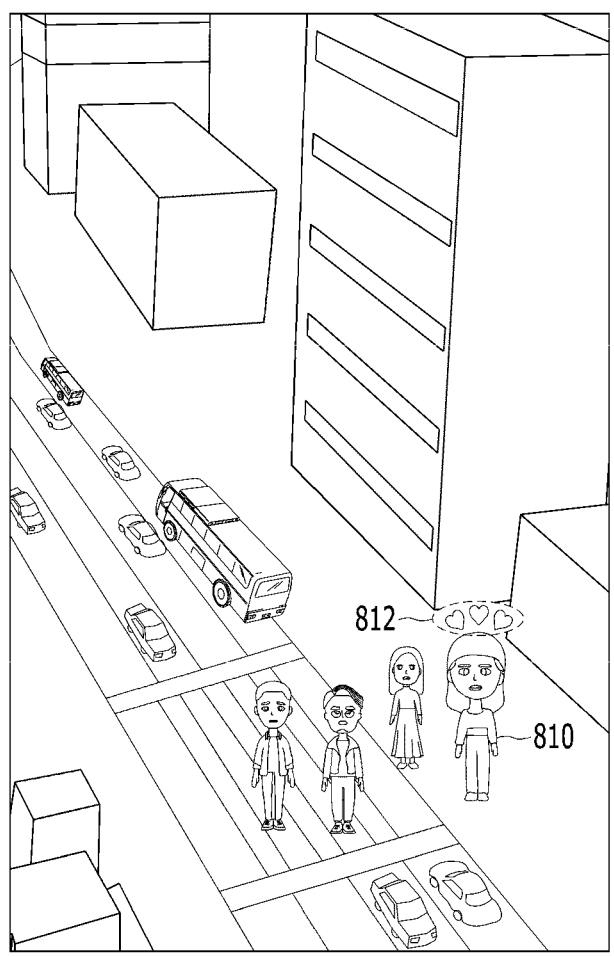
FIG. 8 illustrates one or more example screens, which may be displayed by a user terminal, for explaining an example operation in which a graphic object is added in the vicinity of an avatar according to an evaluation score assigned to the avatar according to at least one example embodiment.

FIG. 8 illustrates one or more example screens, which may be displayed by a user terminal, for explaining an example operation in which a graphic object is added in the vicinity of the avatar according to an evaluation score assigned to the avatar according to at least one example embodiment. As illustrated, a graphic object 812 may be displayed on the avatar associated with a user who, among the users located in the vicinity of the user, has an evaluation score equal to or greater than a predetermined threshold. For example, when the evaluation score assigned to the user associated with the avatar is within a first range (e.g., 3 to 4 star ratings or 500 to 1,000 "likes"), a single heart-shaped icon may be displayed on the face of the corresponding avatar. Likewise, when the evaluation score assigned to the user associated with the avatar is within a second range (e.g., 4 to 4.5 star ratings or 1,000 to 2,000 "likes") and within a third range (e.g., 4.5 to 5 star ratings or more than 2,000 "likes"), a two heart-shaped icon and a three heart-shaped icon may be displayed, respectively. According to this configuration, the user may refer to the graphic object in the vicinity of the avatar displayed on the display to easily check the evaluation scores of the users in the vicinity.

In an embodiment, the size of the corresponding avatar may be determined based on the evaluation score assigned to the user associated with the avatar. For example, an avatar of a user having a high evaluation score may be displayed to be larger than an avatar of a user having a low evaluation score. Alternatively or additionally, the face size of the avatar of the user having a high evaluation score may be displayed to be larger than that of the avatar of the user having a low evaluation score. In this case, the body sizes of the avatars may be displayed the same as each other, and only the face sizes may be displayed differently from each other. With this configuration, the user can more easily identify the avatar of another user having a high evaluation score on the augmented screen.

Additionally, when the user terminal receives a message on the instant messaging application, a voice call request, and the like from another user, the user terminal may display a graphic object about the location of that another user. For example, when the user terminal receives a message from another user, the user terminal may display a graphic object (e.g., an envelope icon, and the like) near an avatar 810 of that another user. In another example, when the user terminal receives a message from another user whose avatar is not displayed on the display, the user terminal may display a graphic object (e.g., an arrow icon, and the like) indicating a direction in which that another user is located in real space in a superimposed manner on the display. With this configuration, the user may identify the approximate location in the real space of another user who has sent a message to the user through the augmented screen.

Figure 9:
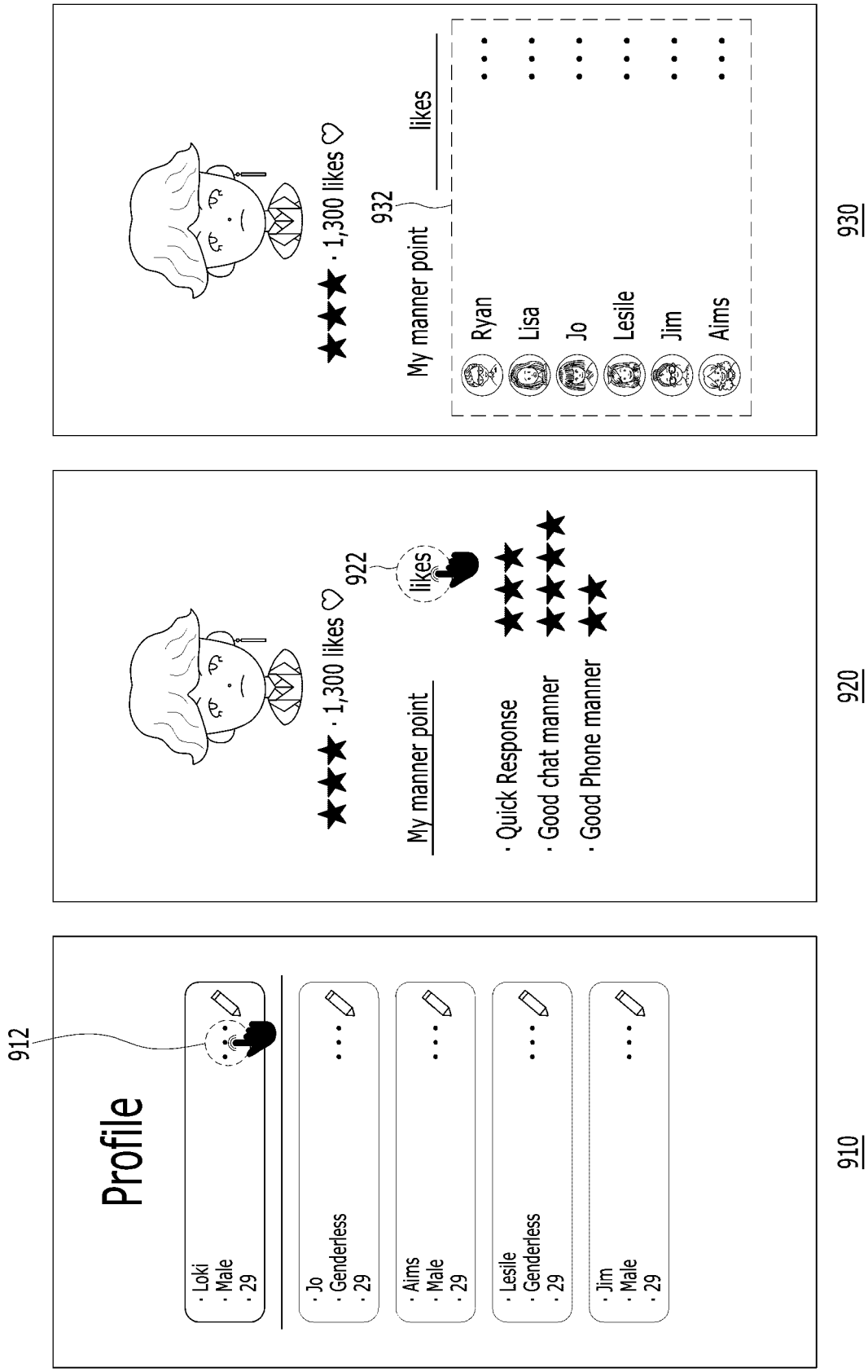
FIG. 9 illustrates one or more example screens, which may be displayed by a user terminal, for explaining an example operation in which a user checks evaluation score for himself/herself determined by the feedbacks from other users according to at least one example embodiment.

FIG. 9 illustrates one or more example screens, which may be displayed by a user terminal, for explaining an example operation in which the user checks the evaluation score for himself/herself determined by the feedbacks from the other users according to at least one example embodiment. FIG. 9 illustrates a first operation step 910, a second operation step 920, and a third operation step 930 of the user terminal. The first operation step 910 represents an example in which the user selects a first area 912 to check the evaluation score assigned to one (Loki) of the profiles (Loki, Jo, Aims, Lesile and Jim) previously created by the user.

The second operation step 920 represents an example in which a star rating of the selected profile (Loki) is displayed on the display in response to the user selecting the first area 912. In an embodiment, the star ratings for each of the items assigned to the selected profile may be displayed on the display. For example, the star ratings for each of the items may include a star rating for quick response, a star rating for good chat manner, a star rating for good phone manner, and the like. Additionally, an average star rating calculated based on the star ratings for each of the items may be displayed on the display. The user may check the star rating for each of the items and the average star rating assigned to the user to check the evaluation of the user of the other users on the location based avatar messenger service.

The third operation step 930 represents an example in which, in response to the user selecting a second area 922, information related to "Likes" given to the selected profile is displayed on the display. In an embodiment, the user may check the number of "likes" (e.g., 1,300 likes) that his/her profile has received. Additionally or alternatively, the user may check a third area 932 for a list of profiles of the other users who have given "likes" to his/her profile. In this example, the list of profiles of the other users may include information such as a representative image of avatar, name (e.g., nickname), and the like of each user.

Additionally, the user may select one from the list of profiles of the other users with a touch input or the like to check detailed information of the corresponding profile (e.g., name, age, gender, hobbies, occupation, interests, and the like), and initiate a chat or voice/video call with the corresponding user. With this configuration, the user can check the counterpart who has expressed a good feeling for his/her avatar, and attempt to communicate with the corresponding counterpart even when the corresponding counterpart is not currently around the user of the user.

Additionally, the user may be provided with a list that recommends some of the counterparts who have given star ratings or "likes" to my (the user's) avatar for a certain period of time. For example, the user may be provided with a list including other users with high similarity to the profile information of the user based on the profile information (e.g., gender, region, age, hobbies, occupation, interests, and the like) of the other users who have given me (the user) a star rating of a certain rating or higher (e.g., 4 or more star rating) during the week. Additionally or alternatively, the user may be provided with a list including other users with high similarity to the profile information of the user based on the profile information (e.g., gender, region, age, hobbies, occupation, interests, and the like) of the other users who have given me (the user) "likes" during the week. In an embodiment, information on the recommended user may be provided in the form of a list or in the form of an avatar on the augmented screen. With this configuration, without putting extra effort, the user can easily check the information on users who have a lot in common with the user himself/herself, among the other users who have a good feeling for the user.

Figure 10:
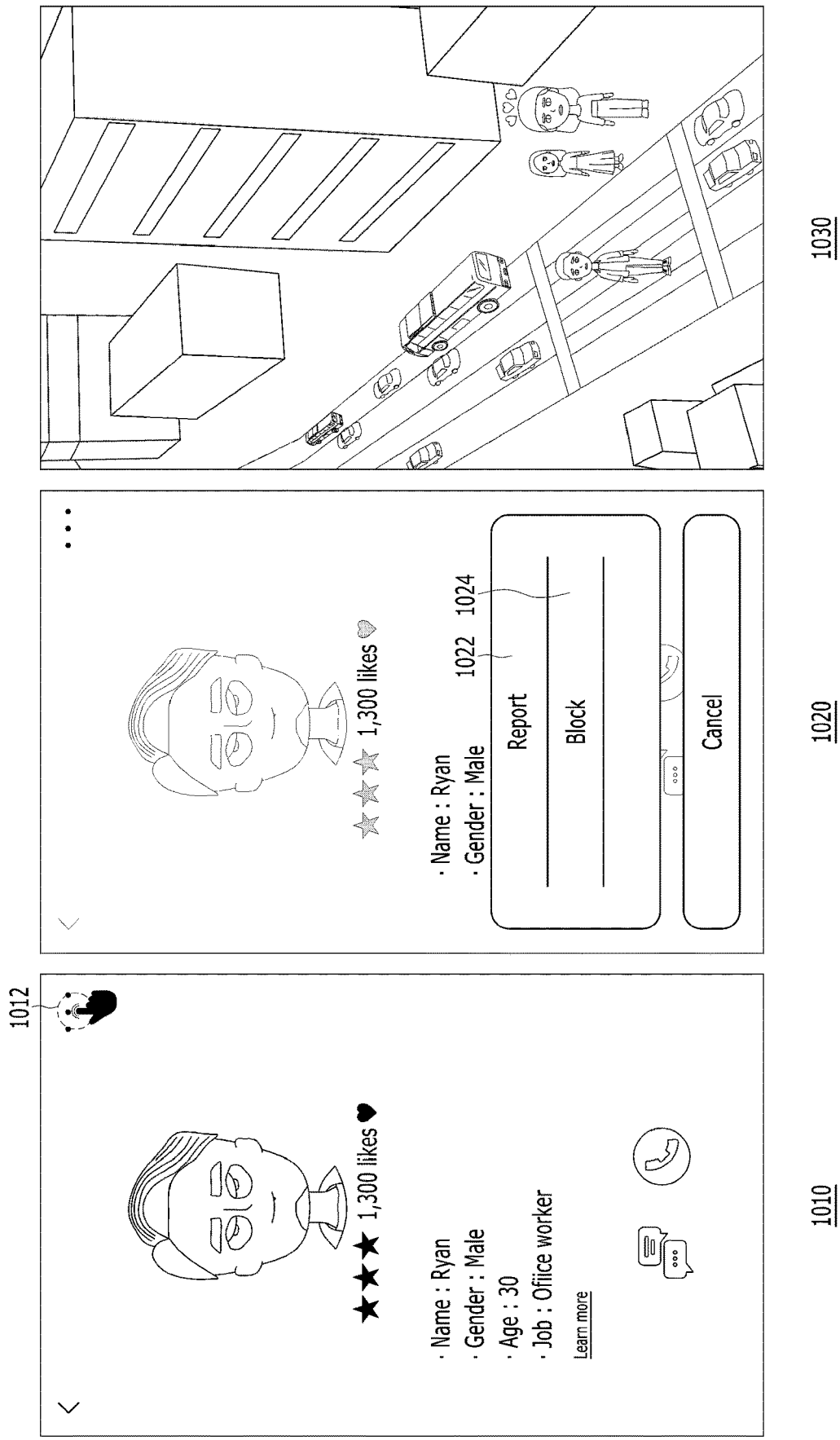
FIG. 10 illustrates one or more example screens, which may be displayed by a user terminal, for explaining an example operation in which a user blocks or reports another user according to at least one example embodiment.

FIG. 10 illustrates one or more example screens, which may be displayed by a user terminal, for explaining an example operation in which the user blocks or reports another user according to at least one example embodiment. FIG. 10 illustrates a first operation step 1010, a second operation step 1020, and a third operation step 1030 of the user terminal. The first operation step 1010 represents an example in which the user selects a first area 1012 in order to block or report another user.

The second operation step 1020 represents an example in which a second area 1022 for reporting another user and a third area 1024 for blocking another user are displayed on the display. The user may select the second area 1022 with a touch input or the like to report inappropriate behavior of another user to the provider of the location based avatar messenger service. Alternatively or additionally, the user may select the third area 1024 to block another user.

The third operation step 1030 represents an example in which the avatar of another user who is blocked or reported by the user selecting the second area 1022 or the third area 1024 with a touch input or the like is not displayed on the user terminal. In this case, even when the blocked or reported user is located within a predetermined distance (e.g., 200 m) in the image capturing direction of the user terminal, the avatar of the corresponding user may not be displayed on the user terminal. Additionally or alternatively, the avatar of the user may not be displayed on the terminal of another user who is blocked or reported. Additionally or alternatively, use of the location based avatar messenger service by another user who is blocked or reported may be partially or entirely restricted. Additionally or alternatively, another user who is blocked or reported may be prohibited from sending messages or making calls to the user.

In an embodiment, the user may view a list of other users that he/she has blocked or reported, and unblock or un-report some or all other users. In this case, the avatar of another user who is unblocked or un-reported may be displayed again on the user's terminal. In addition, the avatar of the user may be displayed again on the terminal of another user who is unblocked or un-reported.

Figure 11:
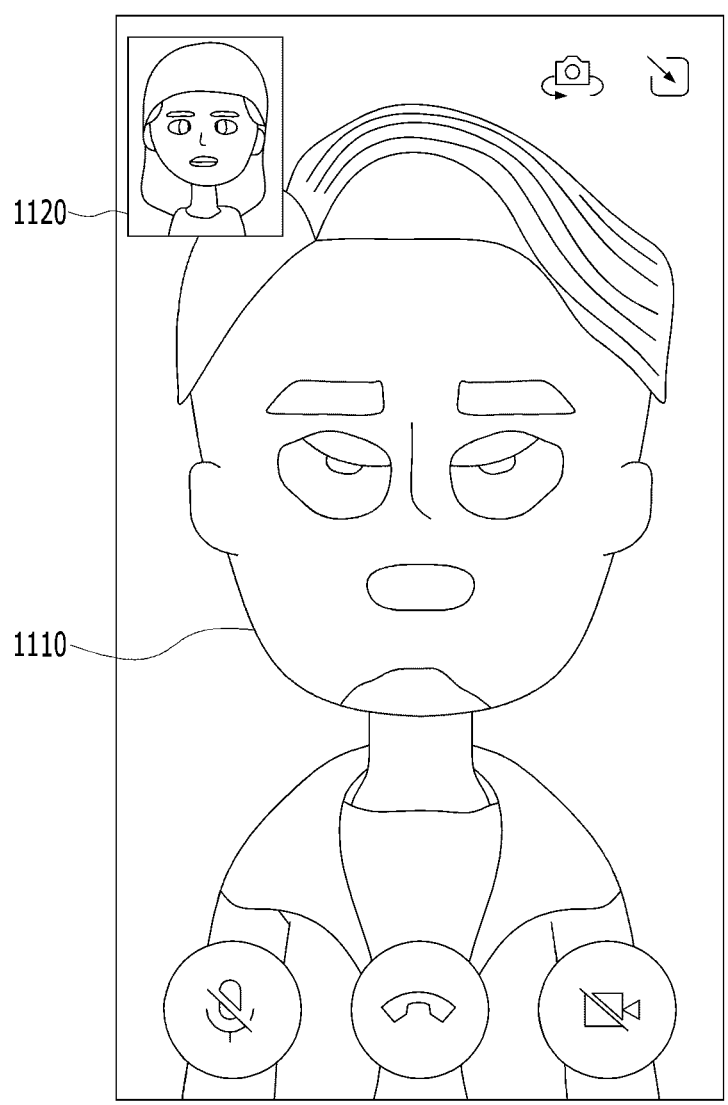
FIG. 11 illustrates one or more example screens, which may be displayed by a user terminal, for explaining an example operation in which a user makes a voice call with another by using his/her avatar according to at least one example embodiment.

FIG. 11 illustrates one or more example screens, which may be displayed by a user terminal, for explaining an example operation in which the user makes a voice call with another by using his/her avatar according to at least one example embodiment. In an embodiment, the user may select one of the avatars of the users in the vicinity which are displayed on the augmented screen and make a voice call with the user associated with the selected avatar. In this case, during the voice call, a counterpart avatar 1110 and a user avatar 1120 may be displayed on the display.

In an embodiment, the motion of the counterpart avatar 1110 may be controlled based on the voice data of the counterpart. For example, the mouth shape, facial expression, and the like of the counterpart avatar 1110 may be controlled based on the voice data of the counterpart. Likewise, the motion of the user avatar 1120 may be controlled based on the voice data of the user. With this configuration, users who use the location based avatar messenger service can make a video call using avatar images and without revealing his/her face.

FIG. 12 illustrates a method for providing the location based avatar messenger service according to at least one example embodiment. According to at least one example embodiment, a method 1200 for providing the location based avatar messenger service may be performed by the user terminal (e.g., at least one processor of the user terminal). The method 1200 may be initiated by transmitting location information of the user terminal to the external system, at S1210.

Then, the user terminal may receive information on users located in the vicinity of the user terminal from the external system, at S1220. In this example, the information on users located in the vicinity may include location information, profile information, avatar information, and the like of the corresponding users. In addition, the user terminal may receive at least one image from the image sensor of the user terminal, at S1230. For example, according to at least some example embodiments, in operation S1220, the user terminal (e.g., user terminal 210 of FIG. 3) may obtain an image by using an image sensor included in the user terminal (e.g., an image sensor included in the input and output device 320 of FIG. 3) to generate (e.g., capture) the image.

In response to receiving at least one image, the user terminal may display, on the display of the user terminal, the avatars associated with the users located in the vicinity on the at least one image in a superimposed manner, at S1240. For example, the user terminal may display on the display a first set of avatars associated with the users located in the vicinity on the at least one image in a superimposed manner.

In this example, the first set of avatars may be avatars associated with users who are, among the users located in the vicinity, located within a predetermined distance in the image capturing direction of the image sensor. Additionally or alternatively, the first set of avatars displayed on the display may be determined based on the evaluation scores associated with the users located in the vicinity.

In an embodiment, the size of each of the first set of avatars displayed on the display may be determined based on the distance between the users located in the vicinity and the user terminal. Additionally or alternatively, the location of each of the first set of avatars displayed on the display may be determined based on the distance between the users located in the vicinity and the user terminal. Additionally or alternatively, the face size of each of the first set of avatars displayed on the display may be determined based on the evaluation scores associated with the users located in the vicinity. Additionally or alternatively, the size of each of the first set of avatars displayed on the display may be determined based on the evaluation scores associated with the users located in the vicinity.

Then, the user terminal may receive a selection for one of the avatars displayed on the display, at S1250. In this case, the user terminal may display the profile information of the user associated with the selected avatar on the display, S1260. In addition, the user terminal may transmit, to the external system, a request to create a chat room on the instant messaging application with the user associated with the selected avatar, at S1270. In this example, the chat room may be an open chat room that minimizes or, alternatively, reduces the exposure of personal information.

Additionally or alternatively, the user terminal may transmit, to the external system, a request to make a voice call on the instant messaging application with the user associated with the selected avatar. In this case, during the voice call, the user terminal may display the selected avatar on the display, and the motion of the selected avatar displayed on the display may be controlled based on the voice data of the voice call counterpart.

The methods, operations, or techniques of this disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although the embodiments described above have been described as utilizing aspects of the currently disclosed subject matter in one or more standalone computer systems, embodiments are not limited thereto, and may be implemented in conjunction with any computing environment, such as a network or distributed computing environment. Furthermore, aspects of the subject matter in the present disclosure may be implemented in multiple processing chips or devices, and storage may be similarly influenced across a plurality of devices. Such devices may include PCs, network servers, and portable devices.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

The invention claimed is:

1. A method for providing a location based avatar messenger service:
   transmitting, by a user terminal, location information of the user terminal to an external system;
   receiving, by the user terminal, information on users located in a vicinity of the user terminal from the external system;
   obtaining, by an image sensor of the user terminal, at least one image; and
   displaying, on a display of the user terminal, the at least one image and a first set of avatars associated with the users located in the vicinity such that the first set of avatars is superimposed on the at least one image,
   the first set of avatars including one or more avatars,
   the one or more avatars corresponding, respectively, to one or more users from among the users located in the vicinity,
   wherein a size of each of the one or more avatars included in the first set of avatars displayed on the display is determined based on a distance between the user terminal and the one or more users to which the one or more avatars included in the first set of avatars correspond, and
   wherein a face size of each of the one or more avatars included in the first set of avatars displayed on the display is determined based on evaluation scores associated with the one or more users to which the one or more avatars included in the first set of avatars correspond.

2. The method according to claim 1, further comprising:
   receiving a selection of one avatar from among the first set of avatars displayed on the display; and
   displaying profile information of a user associated with the selected avatar on the display.

3. The method according to claim 1, further comprising:
   receiving a selection of one avatar from among the first set of avatars displayed on the display; and
   transmitting, to the external system, a request to create a chat room on an instant messaging application with a user associated with the selected avatar.

4. The method according to claim 3, wherein the chat room is an open chat room.

5. The method according to claim 1, further comprising:
   receiving a selection of one avatar from among the first set of avatars displayed on the display; and
   transmitting, to the external system, a request to make a voice call on an instant messaging application with a user associated with the selected avatar.

6. The method according to claim 5, further comprising:
   during the voice call, displaying the selected avatar on the display, and
   controlling a motion of the selected avatar displayed on the display based on voice data of a counterpart in the voice call.

7. The method according to claim 1, wherein, among the users located in the vicinity, the one or more avatars included in the first set of avatars are associated, respectively, with one or more users located within a first distance in an image capturing direction of the image sensor, from among the users located in the vicinity.

8. The method according to claim 1, wherein a location of each of the one or more avatars included in the first set of avatars displayed on the display is determined based on a distance between the user terminal and the one or more users to which the one or more avatars included in the first set of avatars correspond.

9. The method according to claim 1, wherein the first set of avatars displayed on the display are determined based on evaluation scores associated with the users located in the vicinity.

10. The method according to claim 1, further comprising:
    displaying a first graphic object on an avatar associated with a user, from among the users located in the vicinity, who has an evaluation score equal to or greater than a first threshold.

11. The method according to claim 1, further comprising:
    in response to a change in an image capturing direction of the image sensor, displaying, on the display of the user terminal, the at least one image and a second set of avatars, such that the second set of avatars are superimposed on the at least one image,
    the second set of avatars including one or more avatars corresponding, respectively, to one or more users from among the users located in the vicinity.

12. The method according to claim 1, further comprising:
    in response to a change in a zoom level of the image sensor, displaying, on the display of the user terminal, the at least one image and a third set of avatars, such that the third set of avatars are superimposed on the at least one image, the third set of avatars including one or more avatars corresponding, respectively, to one or more users from among the users located in the vicinity.

13. The method according to claim 1, further comprising:

in response to receiving a filtering condition, displaying, on the display of the user terminal, the at least one image and a fourth set of avatars, such that the fourth set of avatars are superimposed on the at least one image, the fourth set of avatars including one or more avatars corresponding, respectively, to one or more users from among the users located in the vicinity.

14. The method according to claim 1, further comprising:

receiving an input indicating that an avatar from among the first set of avatars displayed on the display is blocked; and in response to the input, excluding the blocked avatar from the one or more avatars included in the first set of avatars displayed on the display.

15. The method according to claim 1, further comprising:

in response to receiving a message on an instant messaging application from another user, displaying, on the display, the at least one image such that a second graphic object indicating a location of the another user is superimposed on the at least one image.

16. A non-transitory computer-readable recording medium storing computer-readable instructions that, when executed by one or more processors, cause the one or more processors to perform the method according to claim 1.

17. A device for providing a location based avatar messenger service, comprising:

a communication module;

a memory storing computer-readable instructions;

an image sensor;

a display; and at least one processor connected to the memory and configured to execute the computer-readable instructions such that the at least one processor is configured to, transmit location information of the device to an external system, receive information on users located in a vicinity of the device from the external system, obtain, using the image sensor, at least one image, and display, on the display, the at least one image and a first set of avatars associated with the users located in the vicinity such that the first set of avatars is superimposed on the at least one image, the first set of avatars including one or more avatars, the one or more avatars corresponding, respectively, to one or more of the users located in the vicinity, wherein a size of each of the one or more avatars included in the first set of avatars displayed on the display is determined based on a distance between the device and the one or more users to which the one or more avatars included in the first set of avatars correspond, and wherein a face size of each of the one or more avatars included in the first set of avatars displayed on the display is determined based on evaluation scores associated with the one or more users to which the one or more avatars included in the first set of avatars correspond.

* * * * *